(12) United States Patent
Micale

(10) Patent No.: US 6,811,598 B1
(45) Date of Patent: Nov. 2, 2004

(54) INK COMPOSITION AND PROCESS FOR PRODUCING THE SAME

(75) Inventor: Fortunato Joseph Micale, Bethlehem, PA (US)

(73) Assignee: Natural Pest FX, Inc., Raleigh, NC (US)

( * ) Notice: Subject to any disclaimer, the term of this patent is extended or adjusted under 35 U.S.C. 154(b) by 0 days.

(21) Appl. No.: 10/155,565

(22) Filed: May 24, 2002

Related U.S. Application Data

(60) Provisional application No. 60/292,958, filed on May 24, 2001.

(51) Int. Cl.⁷ ............................................... C09D 11/00
(52) U.S. Cl. ............................... 106/31.61; 106/31.65; 523/160; 523/161
(58) Field of Search .................... 106/31.61, 31.65; 523/160, 161; 524/200, 205, 210

(56) References Cited

U.S. PATENT DOCUMENTS

| | | | | |
|---|---|---|---|---|
| 4,640,714 A | * | 2/1987 | Kagota et al. ........... | 106/31.16 |
| 4,665,107 A | * | 5/1987 | Micale ....................... | 523/105 |
| 4,936,916 A | * | 6/1990 | Shinmitsu et al. .......... | 523/210 |
| 5,234,711 A | * | 8/1993 | Kamen et al. ......... | 427/213.34 |
| 5,990,230 A | * | 11/1999 | Muramatsu et al. ........ | 524/590 |
| 2003/0010252 A1 | * | 1/2003 | Arita et al. .............. | 106/31.27 |

* cited by examiner

Primary Examiner—Mark L. Bell
Assistant Examiner—Veronica F. Faison
(74) Attorney, Agent, or Firm—Coats & Bennett, P.L.L.C.

(57) ABSTRACT

An ink composition having an array of encapsulating particles contained within a liquid medium. The encapsulating particles encapsulate one or more pigment particles. The ink composition is prepared and formulated such that the density of the encapsulating particles approximate the density of the liquid medium containing the encapsulating particles such that a neutral buoyancy is achieved. More particularly, in a case where the liquid medium is water, the density of the encapsulating particles ranges from 0.9 g/cc to 1.1 g/cc.

30 Claims, No Drawings

INK COMPOSITION AND PROCESS FOR PRODUCING THE SAME

RELATED APPLICATIONS

This application claims priority benefit under 35 U.S.C. 119(e) from U.S. provisional application Ser. No. 60/292,958 filed on May 24, 2001, and entitled "The Concept and a Process for Preparing Neutrally Buoyant Encapsulated Pigments for Ink Jet Inks," which is incorporated in its entirety by reference herein.

BACKGROUND OF THE INVENTION

This invention relates to aqueous printing inks and, more specifically, to aqueous pigmented ink jet ink formulations suitable for use in commercial ink jet ink printers. The most popular form of ink jet ink printing is a type of digital printing in which droplets of ink are ejected on demand from an orifice in a pinhead chamber in response to pressure increases in the chamber. The amplitude and frequency of the chamber pressure profiles are controlled digitally through a computer by sending electronic signals which results either in localized heating and boiling of the ink, or which activates a piezoelectric vibrating crystal in the chamber.

The past decade has seen a dramatic increase in this type of printing for office and personal printer applications primarily due to its relatively low cost, flexibility, speed, and quiet operation. Recent years have seen an even more dramatic increase in the popularity of ink jet printers due to the further development and resulting introduction of high quality printers, software, media and improved inks all of which tend to produce near photographic quality color graphics. Despite this rapid rise in the popularity of ink jet printing, a problem, which has persisted for photographic applications, is the lack of wet rub resistance and the instability of color quality to UV exposure. This problem is related to the fact that the ink in an ink jet head performs much more reliably as a single-phase system, i.e. where the colorant is a dye dissolved in the liquid phase. An additional problem is that the liquid phase is traditionally water based due to environmental concerns, and water soluble dyes typically exhibit less stability to UV radiation compared to organic soluble dyes, and much less stability compared to colored organic pigments. The fact that a two phase system, i.e. a pigment dispersion, in an ink jet ink presents performance problems also has a negative impact for proofing applications for traditional printing processes. The fact is that this large industry which requires reliable proofing for customer acceptance of printing jobs prior to the actual printing traditionally uses pigmented printing inks because of their color stability, and the color value of pigments are distinctly different compared to the color value of dyes.

There can be problems associated with the formulation of ink jet inks, which are required to perform consistently in an ink jet printer. The introduction of pigments in an ink jet ink can lead to additional problems of 1) clogging of the ink jet head orifice; and 2) sedimentation of pigment particles in the ink cartridge or the ink jet head. Since a pigment dispersion which is professionally formulated and dispersed is typically 50 to 100 times smaller than the ink jet head orifice, clogging is usually not the problem unless pigment sedimentation occurs in the ink jet head. Sedimentation of pigment particles in the ink cartridge results in a colorant concentration gradient that leads to inconsistent print performance with respect to color value. The fact is that a water-based ink has a density close to 1 g/cc compared to colored organic pigment particles that have densities above 1.3 g/cc. Proper performance of an ink jet ink, furthermore, requires that the viscosity of the ink be less than 10 cp, as compared to pure water which has a viscosity of 1cp and commercial paints which have viscosities above 1,000 cp. The physics of the situation is that the sedimentation rate of a particle in a liquid is directly proportional to the particle size and the difference in density between the particle and the liquid medium, and inversely proportional to the viscosity of the liquid medium. Since the liquid medium in most cases is water based with a fixed density and a low viscosity, the sedimentation rate can be reduced or eliminated only by reducing the particle size or matching the density of the particles to the liquid medium. Experimental results, furthermore, have shown that when the calculated particle sedimentation rate falls below a value of 0.05 cm/hr, the sedimentation rate approaches zero due to Brownian motion, which is a random motion induced by thermal forces greater than those imposed by gravity under these conditions. For example, it has been shown experimentally that aqueous dispersions of monodisperse polystyrene latex, where the density differential is 0.05 g/cc, will never settle for particles smaller than 0.2 microns. It should be recognized that the maximum particle size required for zero sedimentation of aqueous dispersions of commercial organic pigments, where the density differential is 0.3 g/cc or greater, is less than 0.1 micron. It should be further recognized that the color value for pigments decrease as the particle size falls below 0.1 micron.

A review of recent developments in ink compositions and processes for formulating and making the same suggest that the primary focus of research activities has been directed towards the following objectives: 1) manufacturing organic pigment particles with smaller primary particle size, where a primary particle is defined as the smallest subdivision of particles; 2) utilizing dispersion techniques which result in pigment dispersions consisting primarily of primary particles, i.e. achieving the smallest particle size distribution possible; and 3) formulating the particle dispersions with surfactants which will stabilize the primary particles with respect to flocculation which leads to a larger particle size.

SUMMARY OF THE INVENTION

The present invention relates to an ink composition comprising a liquid medium with an array of encapsulating particles contained in the liquid medium. The respective encapsulating particles include one or more pigment particles and wherein the encapsulating particles are of a density within approximately 10% of the density of the liquid medium. In one particular embodiment, the size of the pigment particles are predominantly less than 0.3 microns while the size of the encapsulating particles are predominantly in the range of 0 to 1 micron. Further in this particular embodiment, the net density of the encapsulating particles is in the range of 0.9–1.1 g/cc.

Further the present invention entails a process for forming or producing an ink composition. The process comprises encapsulating pigment particles having a density greater than 1.0 g/cc in a matrix having a density of less than 1.0 g/cc to form encapsulating particles having one or more pigment particles contained therein. The process further includes containing the encapsulating particles in a liquid medium, and providing the pigment particles and matrix in a ratio that yields a net density for the encapsulating particles that is within 10% of the density of the liquid medium.

In a particular process for producing the ink composition of the present invention, the process entails producing an ink composition that includes pigment particles encapsulated in a matrix where the encapsulated matrix is neutrally buoyant with respect to a liquid medium containing the encapsulated pigment particles. The process entails dispersing pigment particles in the encapsulating matrix where the encapsulating matrix has been heated to a melting point but below the boiling point of the liquid medium. Further, a surfactant is added to the pigment particle-matrix solution for maintaining dispersion stability of the pigment particles. Additionally, the liquid medium is heated to a temperature that approximates the temperature of the heated matrix. Thereafter, the process includes emulsifying the encapsulated matrix dispersion in the heated liquid medium. By emulsifying the encapsulating matrix within the liquid medium, the ink composition is formed. Thereafter, the ink composition is cooled.

DESCRIPTION OF THE INVENTION

The ink composition of the present invention comprises an array of encapsulating particles having pigment particles contained therein with the encapsulating particles being dispersed throughout a liquid medium. Although various liquids may be used, in a preferred composition the liquid medium would be water or a base composition comprised substantially of water. In a preferred composition, the liquid medium comprises approximately 50% to 95%, by weight, of the ink composition.

Encapsulated particles include an encapsulating matrix. The encapsulating matrix may be a low density, predominantly less than 1 g/cc, low molecular weight polymer that encapsulates the pigment particles. The encapsulating matrix is substantially insoluble in water and exhibits a melting point of less than 100° C. Examples of suitable matrixes are natural and synthetic waxes. In particular, a commercial paraffin wax with a melting point of 56° C., and a density of 0.8 g/cc would constitute an appropriate matrix in this case.

The pigment particles encapsulated have a density predominantly above 1 g/cc and a particle size predominantly less than 0.3 micrometers. In a preferred ink composition, the pigment particles are organic are of various colors suitable for printing applications. Examples of typical pigments are as follows: Sunbite yellow 3, Sunfast blue 15:3, Magenta 112 by Sun Chemical Corporation; and Carbon black mongel GP-3541 by Carbor Corporation.

In a preferred ink composition, the encapsulated particles, containing color organic pigment particles and an encapsulating matrix, have a particle size that is predominantly within the range of 0.1 to 1.0 micrometers and a density predominantly within the range of 0.9 to 1.1 g/cc, creating a neutral buoyancy in the liquid medium. In other words, it is desirable that the density of the encapsulating particles equal or closely approximate the density of the liquid medium. In the case of the ink composition of the present invention and the process for making the same, it is contemplated that the density of the resulting encapsulating particles will be within 10% of the density of the liquid medium. Where water is the liquid medium, it follows that the density of the encapsulating particles should be between 0.9 g/cc and 1.1 g/cc. It is appreciated however, that it is desirable for the density of the encapsulating particles to be as close as practical to the density of the liquid medium containing the encapsulating particles. Since commercially available colored organic pigment particles have density greater than a water based ink liquid medium, neutral buoyancy is accomplished through a technique of particle encapsulation with an encapsulating matrix, which has a density less than the liquid medium. For example, if a group of pigment particles have an average density of 1.3 g/cc and an encapsulating matrix has a density of 0.7 g/cc, then equal amounts by volume of both the pigment particles and encapsulating matrix would result in an encapsulated particle density of 1.0 g/cc which would result in neutral buoyancy in water.

The ink composition may include two types of surfactants, i.e. a water insoluble surfactant which is initially mixed with the encapsulating matrix, and a soluble surfactant which is mixed with the liquid medium. One surfactant that is suitable and water insoluble is Alfonic 1412-140 produced by Vista Chemical Co. Other suitable surfactants that are substantially insoluble in water include Span 80 and Span 85 produced by ICI Americas Inc. It should be noted that it is not always required to have a water insoluble surfactant.

A surfactant that is suitable and water soluble is Triton X-100 (T-100) produced by Fisher Biotech. Other suitable surfactants include Aifproof (NIA), and quaternary ammonium salts, ethoxylated alkyl phenols, ethoxylated alcohols, ethoxylated fatty esters, sulfosuccinate derivatives, alky aryl sulfonates, sorbitan derivatives, and lecithin. Those skilled in the art will appreciate that other surfactants may be used in the ink composition, and that surfactants can be negatively, positively, or neutrally charged.

In formulating and making the ink composition of the present invention, the encapsulating matrix is heated above its melting point, and below the boiling point of the liquid medium. Most encapsulating matrixes have a melting point in the range of 40° C. to 99° C. In one preferred composition, commercial paraffin wax is melted above its melting point of 56° C. resulting in the wax being liquefied.

A suitable surfactant that is insoluble in water, such as Span 85, can be dissolved in the liquefied encapsulating matrix. As noted above, one or more surfactants may be included in the ink composition. However, as shown in the examples to follow, it is not necessary to always include a surfactant that is insoluble in water.

The pigment particles are dispersed in the encapsulating matrix solution using suitable milling techniques, such as techniques that include but are not limited to ultrasonics and rotar-stator milling. In a preferred composition, the milling will be sufficient to form a pigment particle size that is predominately less than 0.3 micrometers and an encapsulated particle size of less than one micrometer, creating a pigment particle/matrix solution that will not clog at the ink jet head orifice.

Separately, a liquid medium, such as water, is heated to approximately the same temperature as the pigment particle/matrix solution. A suitable surfactant that is soluble in water, such as TritonX-100, is dissolved in the liquid medium.

The pigment particle/matrix solution is emulsified in the liquid medium using suitable emulsification techniques, such as techniques that include but are not limited to ultrasonics and rotar-stator milling, yielding an emulsion drop size that is predominately less than one micrometer. By emulsifying the pigment particle/matrix solution in the liquid medium, a heated ink composition is formed. Thereafter, the temperature of the heated ink composition is reduced below the melting point of the encapsulating matrix.

As noted above, in a preferred ink composition, it is desirable for the encapsulated particles to be generally neutrally buoyant with respect to the liquid medium. This can be achieved by selectively mixing the pigment particles and the encapsulating matrix according to a selected volumetric ratio. That is, assuming that a net density of 1.0 g/cc was desired and that the average density of the pigment particles was approximately 1.3 g/cc and the average density of the encapsulating matrixes was approximately 0.7 g/cc, it follows that mixing an equal volume of the pigment particles with an equal volume of the encapsulating matrix would yield encapsulated particles that would have a net density of approximately 1.0 g/cc. The net density of approximately 1.0 g/cc allows the encapsulated particles to remain suspended within the liquid medium and substantially dispersed throughout the ink composition, preventing high amounts of particle sedimentation or creaming within the ink composition.

The following are four examples of ink compositions according to the present invention:

EXAMPLE 1

YELLOW PIGMENTED INK COMPOSITION

| Component | Percent composition by weight (%) |
|---|---|
| Pigment | 13.6 |
| Encapsulating Matrix (Wax) | 22.7 |
| T-100 | 3.3 |
| NIA | 1.3 |
| Liquid Medium (Water) | 59.1 |

EXAMPLE 2

BLUE PIGMENTED INK COMPOSITION

| Component | Percent composition by weight (%) |
|---|---|
| Pigment | 16.0 |
| Encapsulating Matrix (Wax) | 16.0 |
| T-100 | 2.0 |
| NIA | 2.0 |
| Liquid Medium (Water) | 64.0 |

EXAMPLE 3

RED PIGMENTED INK COMPOSITION

| Component | Percent composition by weight (%) |
|---|---|
| Pigment | 15.0 |
| Encapsulating Matrix (Wax) | 15.0 |
| T-100 | 2.1 |
| NIA | 0.9 |
| Liquid Medium (Water) | 67.0 |

EXAMPLE 4

CARBON BLACK PIGMENTED INK COMPOSITION

| Component | Percent composition by weight (%) |
|---|---|
| Pigment | 12.0 |
| Encapsulating Matrix (Wax) | 20.0 |
| T-100 | 2.8 |
| NIA | 1.2 |
| Liquid Medium (Water) | 64.0 |

One major operational problem associated with pigmented ink compositions is crusting of the pigment particles at the inkjet head orifice. The crusting effect is normally the result of the interaction between the dispersed pigment particles in the composition and the ink-liquid/air interface. It has been shown experimentally that water/air interfaces tend to be strongly negative. The problem is to prevent the dispersed pigment particles from interacting with this negatively charged interface because there is a tendency for dewetting to result which leads to crusting of the inkjet head orifice.

This problem can be solved or at least minimized by utilizing Coulombic stabilization. Coulombic stabilization is a process of ionic repulsion of like charges between individual particles brought about by the preferential adsorption of either positive or negative ions on the particle surfaces. Coulombic stabilization can be invoked as the operational mechanism for preventing pigment particles from interacting, and thus dewetting, at this interface.

Therefore, it is desirable for the encapsulated particles to be Coulombically stabilized within the ink composition. This can be achieved by conditioning the ink composition such that the encapsulated particles are predominately negatively or positively charged. In the case of the examples set forth above, an anionic surfactant is utilized to negatively charge the ink composition.

Further, and importantly, the size of the encapsulated particles contributes to the effective Coulombic stabilization. In particular, Coulombic stabilization is effective where the encapsulated particle size falls within the range of 0.1 to 1.0 micrometers.

The term predominately has been used herein and means at least a majority. For example, the encapsulated particles are said to be predominately of a size within the range of 0.1 to 1.0 micrometers. This means that more than 50% of the encapsulated particles will be of a size that falls within range.

What is claimed is:

1. An ink composition comprising: a liquid medium; an array of encapsulating particles contained in the liquid medium with respective encapsulating particles including one or more pigment particles; the pigment particles being predominately less than 0.3 microns and the encapsulating particles being predominately in the range of 0.1 to 1.0 microns; wherein the encapsulating particles are predominately of a density of 0.9–1.1 g/cc such that the encapsulating particles are predominately neutral buoyant with respect to the liquid medium; and wherein the encapsulating particles include an outer matrix formed of a material that is substantially insoluble in water, has a density less than 1.0 g/cc, and a melting point of less than 100° C. and wherein the material forming the matrix is a low density, low molecular weight polymer and is a natural or synthetic wax.

2. The ink composition of claim 1 wherein the encapsulating particles are predominately negatively charged.

3. The ink composition of claim 1 wherein the outer matrix has a density less than 1.0 g/cc, and wherein the pigment particles have a density greater than 1.0 g/cc, and wherein the net density of the encapsulating particles is between 0.9 and 1.1 g/cc.

4. The ink composition of claim 1 including first and second surfactants, the first surfactant being substantially insoluble in water and the second surfactant being substantially soluble in water.

5. The ink composition of claim 1 wherein the liquid medium includes water; and wherein the density of the encapsulating matrix is within at least 10% of the density of the water.

6. The ink composition of claim 1 wherein the ink composition includes at least one water substantially insoluble surfactant which is soluble in the encapsulating matrix and which stabilizes the pigment particles and generally prevents flocculation.

7. The ink composition of claim 6 including at least one water substantially soluble surfactant which promotes emulsification of the encapsulating matrix and stabilizes the pigment particles.

8. The ink composition of claim 1 wherein the matrix has a solubility in the liquid medium of less than 5%.

9. The ink composition of claim 1 wherein the pigment particles include carbon black pigment particles.

10. A process for producing an ink composition comprising; encapsulating pigment particles having a density greater than 1.0 g/cc in a matrix having a density of less than 1.0 g/cc to form encapsulating particles having one or more pigment particles; containing the encapsulating particles in a liquid medium; providing the pigment particles and matrix in a ratio to yield a net density for the encapsulating particles that is within 10% of the density of the liquid medium; and dispersing the pigment particles in the encapsulating matrix at a temperature above the mailing point of the matrix but below the boiling point of the liquid medium.

11. The process of claim 10 wherein the pigment particles within the composition are predominantly less than 0.3 microns in size.

12. The process of claim 10 wherein the encapsulating particles formed are predominantly in the range of 0.3–1.0 microns in size.

13. The process of claim 11 wherein the encapsulating particles formed are predominantly in the range of 0.3–1.0 microns in size.

14. The process of claim 10 wherein the pigment particles are conditioned such that the pigment particles are of a size of 0.3 microns or less.

15. The process of claim 10 wherein the pigment particles and the encapsulating matrix form an encapsulating matrix dispersion, and wherein the process includes emulsifying the encapsulating matrix dispersion in the liquid medium.

16. The process of claim 10 including separately heating the matrix and liquid medium to a temperature above the melting point of the matrix resulting in the matrix being liquefied; adding an organic soluble surfactant to the matrix and a water soluble surfactant to the liquid medium; dispersing pigment particles into the liquefied matrix; emulsifying the pigment particle-matrix solution in the liquid medium so as to produce an ink composition; and cooling the ink composition.

17. The process of claim 16 wherein cooling the ink composition results in solidification of the matrix where the density of the encapsulated pigment particles is a function of the density of the pigment particles and the density of the encapsulating matrix.

18. The process of claim 16 wherein the organic soluble surfactant is taken from the group consisting of quaternary ammonium salts, ethoxylated alkyl phenols, ethoxylated alcohols, ethoxylated fatty esters, sulfosuccinate derivatives, alkyl aryl sulfonates, sorbitan derivatives, and lecithin.

19. The process of claim 16 wherein dispersing the pigment particles into the liquefied matrix include using high energy ultrasonic or high speed stirring.

20. The process of claim 16 wherein emulsifying the pigment particle-matrix solution in the liquid medium is achieved through high energy ultrasonic or high speed stirring.

21. An ink composition comprising: a liquid medium; an array of encapsulating particles contained in the liquid medium with respective encapsulating particles including one or more pigment particles; the pigment particles being predominately less than 0.3 microns and the encapsulating particles being predominately in the range of 0.1 to 1.0 microns; wherein the encapsulating particles are predominately of a density of 0.9–1.1 g/cc such that the encapsulating particles are predominately neutral buoyant with respect to the liquid medium; and first and second surfactants, the first surfactant being substantially insoluble in water and the second surfactant being substantially soluble in water.

22. An ink composition comprising: a liquid medium; an array of encapsulating particles contained in the liquid medium with respective encapsulating particles including one or more pigment particles; the pigment particles being predominately less than 0.3 microns and the encapsulating particles being predominately in the range of 0.1 to 1.0 microns; wherein the encapsulating particles are predominately of a density of 0.9–1.1 g/cc such that the encapsulating particles are predominately neutral buoyant with respect to the liquid medium; and wherein the encapsulating particles include a matrix and wherein the ink composition is formed by heating and melting the matrix; dispersing the pigment particles within the matrix to form a pigment particle-matrix solution; and adding the pigment particle-matrix solution to the liquid medium.

23. An ink composition comprising: a liquid medium; an array of encapsulating particles contained in the liquid medium with respective encapsulating parties including one or more pigment particles; the pigment particles being predominately less then 0.3 microns and the encapsulating particles being predominately in the range of 0.1 to 1.0 microns; wherein the encapsulating particles are predominately of a density of 0.9–1.1 g/cc such that the encapsulating particles are predominately neutral buoyant with respect to the liquid medium; and wherein the encapsulating particles include an outer matrix formed of a low density, low molecular weight polymer and includes a naturally or laboratory prepared paraffin wax with a melting point in the range of 40° C. to 99° C.

24. An ink composition comprising: a liquid medium; an array of encapsulating particles contained in the liquid medium with respective encapsulating particles including one or more pigment particles; the pigment particles being predominately less than 0.3 microns and the encapsulating particles being predominately in the range of 0.1 to 1.0 microns; wherein the encapsulating particles are predominately of a density of 0.9–1.1 g/cc such that the encapsulating particles are predominately neutral buoyant with respect to the liquid medium; and an encapsulating matrix having a low molecular polymer with a melting point in the range of 40° C. to 99° C.

25. A process for producing an ink composition comprising; encapsulating pigment particles having a density greater than 1.0 g/cc in a matrix having a density of less than 1.0 g/cc to form encapsulating particles having one or more pigment particles; containing the encapsulating particles in a liquid medium; providing the pigment particles and matrix in a ratio to yield a net density for the encapsulating particles that is within 10% of the density of the liquid medium; and heating the matrix to a temperature in the range of 40°–90° and dispersing the pigment particles into the heated matrix to form an encapsulating matrix dispersion; heating the liquid medium to a temperature of at least 40° C; and emulsifying the encapsulation dispersion in the heated liquid medium to form the ink composition.

26. The ink composition of claim 22 including heating the matrix to a temperature above the melting point of the matrix but below the boiling point of the liquid medium.

27. The ink composition of claim 26 including heating the liquid medium to a temperature above the melting point of the matrix and below the boiling point of the liquid medium, and mixing the liquid medium with the pigment particle-matrix solution.

28. The process of claim 25 including cooling the formed ink composition.

29. The process of claim 25 including adding a first surfactant to the matrix and pigment particles where the first surfactant is substantially soluble in the liquid medium.

30. The process of claim 29 including adding a second surfactant to the liquid medium that is substantially soluble in the liquid medium.

* * * * *